United States Patent [19]

Maeda

[11] Patent Number: 4,740,553

[45] Date of Patent: Apr. 26, 1988

[54] MOLDING COMPOSITION CONTAINING AN ELASTOMER-CONTAINING STYRENE RESIN, A POLYCARBONATE RESIN, AND A POLYMER OF AN ACRYLATE MONOMER POSSESSING ENVIRONMENTAL STRESS CRACKING RESISTANCE

[75] Inventor: Tetsuro Maeda, Ichihara, Japan

[73] Assignee: Denki Kagaku Kogyo Kabushiki Kaisha, Tokyo, Japan

[21] Appl. No.: 916,787

[22] Filed: Oct. 8, 1986

[30] Foreign Application Priority Data

Oct. 8, 1985 [JP] Japan ............... 60-222741
Jan. 17, 1986 [JP] Japan ............... 61-6253

[51] Int. Cl.$^4$ .................................. C08L 69/00
[52] U.S. Cl. ............................ 525/67; 525/71; 525/81; 525/82
[58] Field of Search ............... 525/67, 148, 69, 71; 524/501, 504

[56] References Cited

U.S. PATENT DOCUMENTS

| | | | |
|---|---|---|---|
| 3,988,389 | 10/1976 | Margotte et al. | 525/67 |
| 4,098,734 | 7/1978 | Lee | 525/67 X |
| 4,393,169 | 7/1983 | Moriwaki et al. | 525/67 |
| 4,476,266 | 10/1984 | Maeda et al. | 524/128 |
| 4,533,698 | 8/1985 | Maeda et al. | 525/73 |
| 4,638,033 | 1/1987 | Boutni et al. | 525/67 |

FOREIGN PATENT DOCUMENTS

| | | |
|---|---|---|
| 133353 | 10/1981 | Japan . |
| 147841 | 11/1981 | Japan . |
| 155237 | 12/1981 | Japan . |
| 159843 | 10/1982 | Japan . |
| 195140 | 11/1982 | Japan . |
| 160336 | 9/1983 | Japan . |
| 179257 | 10/1983 | Japan . |
| 20917 | 2/1985 | Japan . |
| 36553 | 2/1985 | Japan . |
| 106652 | 5/1986 | Japan . |
| 108654 | 5/1986 | Japan . |

OTHER PUBLICATIONS

Rodriguez, Priciples of Polymer Systems, McGraw—Hill, 1970. p. 22.
Blackley, Synthetic Rubbers, Applied Science Publishers, 1983, pp. 103 and 279.

*Primary Examiner*—Theodore E. Pertilla
*Attorney, Agent, or Firm*—Oblon, Fisher, Spivak, McClelland & Maier

[57] ABSTRACT

A thermoplastic resin composition composed of a mixture comprising:

(A) from 5 to 94% by weight of an elastomer-containing styrene resin comprising an elastomer component and a resin component having a glass transition temperature of higher than 20° C., with a covalent substance of the elastomer and resin components being present at the interface between the elastomer component constituting a dispersed phase and the resin component constituting a continuous phase;

(B) from 5 to 94% by weight of a polycarbonate resin; and (C) from 0.1 to 20% by weight of a polymer of a monomer containing an acrylate monomer having a solubility parameter of from 8.4 to 9.8 (cal/cc)$^{\frac{1}{2}}$, a glass transition temperature of not higher than 20° C. and a gel content of not higher than 70% by weight.

24 Claims, No Drawings

MOLDING COMPOSITION CONTAINING AN ELASTOMER-CONTAINING STYRENE RESIN, A POLYCARBONATE RESIN, AND A POLYMER OF AN ACRYLATE MONOMER POSSESSING ENVIRONMENTAL STRESS CRACKING RESISTANCE

The present invention relates to a thermoplastic resin composition having excellent environmental stress cracking resistance and a process for its preparation.

A composition prepared by mixing an elastomer-containing styrene resin such as an ABS resin with a polycarbonate resin is known, and represents a technique commonly employed in the art for the purpose of improving the impact resistance or the heat resistance of the elastomer-containing styrene resin or for the purpose of improving the thickness dependence of the impact strength of the polycarbonate resin.

When the elastomer-containing styrene resin or the polycarbonate resin is brought in contact with chemical agents under stress, a cracking phenomenon is frequently observed, and in an extreme case, rupture takes place. Such a phenomemon is called an environmental stress cracking phenomenon, and is distinctly observed with a chemical agent having a poor solubility to the resin, such as an alkane, an alkene, an alcohol, a carboxylic acid or an ester, as is well known.

Such an environmental stress cracking phenomenon occurs even when no external force is exerted to the molded resin product, since it results from the release of a residual internal molding strain when the molded product is brought in contact with the chemical agent. Thus, the environmental stress cracking phenomenon puts a substantial restriction to the applications of the resin.

The resin composition obtained by mixing the elastomer-containing styrene resin and the polycarbonate resin, provides no distinct improvement in the environmental stress cracking phenomenon over the elastomer-containing styrene resin or the polycarbonate resin as the constituting component of the composition. Under the circumstances, in order to improve the environmental stress cracking resistance of the composition, it has been proposed, for instance, (i) to increase the content of the elastomer component in the elastomer-containing styrene resin, (ii) to increase the molecular weight of the resin component of the elastomer-containing styrene resin, (iii) to increase the content of the polar groups in the resin component of the elastomer-containing styrene resin, or (iv) to increase the molecular weight of the polycarbonate resin. However, these proposals had drawbacks such that they tended to degrade the molding processability of the composition, and yet the degree of the improvement in the environmental stress cracking resistance was still inadequate for practical purposes.

As described above, the resin composition composed of a mixture comprising an elastomer-containing styrene resin and a polycarbonate resin, is inferior in the environmental stress cracking resistance, and no effective means to overcome the drawback has been presented.

Accordingly, it is an object of the present invention to provide a thermoplastic resin composition comprising an elastomer-containing styrene resin and a polycarbonate resin as constituting components and having improved environmental stress cracking resistance.

The present invention provides a thermoplastic resin composition composed of a mixture comprising:

(A) from 5 to 94% by weight of an elastomer-containing styrene resin comprising an elastomer component and a resin component having a glass transition temperature of higher than 20° C., with a covalent substance or bonding of the elastomer and resin components being present at the interface between the elastomer component constituting a dispersed phase and the resin component constituting a continuous phase;

(B) from 5 to 94% by weight of a polycarbonate resin; and (C) from 0.1 to 20% by weight of a polymer of a monomer containing an acrylate monomer having a solubility parameter of from 8.4 to 9.8 $(cal/cc)^{\frac{1}{2}}$, a glass transition temperature of not higher than 20 20 C. and a gel content of not higher than 70% by weight.

The present invention also provides a process for preparing such a thermoplastic resin composition, which comprises mixing from 10 to 80% by weight (as solid content of polymer) of an emulsion of the polymer of component (C) and from 20 to 90% by weight (as solid content of polymer) of an emulsion of (D) a polymer of a vinyl monomer having a glass transition temperature of higher than 20° C., a gel content of not higher than 10%, a solubility parameter of from 9.0 to 11.0 $(cal/cc)^{\frac{1}{2}}$ and a weight average molecular weight, based on polystyrene, of at least $2 \times 10^5$, in an emulsion state; then separating (E) a polymer composition from the mixture; and mixing from 0.5 to 50% by weight of the polymer composition (E) with from 5 to 94% by weight of the elastomer-containing styrene resin and from 5 to 94% by weight of the polycarbonate resin.

The thermoplastic resin composition according to the present invention is superior also in the impact strength to the composition composed solely of the elastomer-containing styrene resin and the polycarbonate resin.

Now, the present invention will be described in detail with reference to the preferred embodiments.

The elastomer-containing styrene resin as component (A) of the present invention comprises an elastomer component and a resin component having a glass transition temperature of higher than 20° C., and a covalent substance or bonding of the elastomer and resin components is present at the interface between the elastomer component constituting a dispersed phase and the resin component constituting a continuous phase.

The monomer constituting the elastomer component of the elastomer-containing styrene resin as component (A) in the present invention, includes a conjugated diene monomer such as butadiene, isoprene, dimethylbutadiene, chloroprene or cyclopentadiene; a non-conjugated diene such as 2,5-norbornadiene, 1,4-cyclohexadiene or 4-ethylidenenorbornene; an aromatic vinyl monomer such as styrene, α-methylstyrene or vinyl toluene; a vinyl cyanide monomer such as acrylonitrile or methacrylonitrile; a (meth)acrylate monomer such as methyl methacrylate, ethyl acrylate, butyl acrylate, hexyl acrylate or octyl acrylate; and an olefin monomer such as ethylene, propylene, 1-butene, isobutylene or 2-butene. These monomers may be homopolymerized or copolymerized for use. Further, a copolymer obtained by copolymerizing a polyfunctional monomer as a crosslinking monomer, may also be employed. The polyfunctional vinyl monomer to be employed for such a copolymer includes divinyl benenze, ethylene glycol dimethacrylate, 1,3-butylene glycol dimethacrylate, 1,4-butylene glycol dimethacrylate, propylene glycol dimethacrylate, triallyl cyanurate, trially isocyanurate, trimethylolpropane trimethacrylate, allyl acrylate, allyl methacrylate, vinyl acrylate, vinyl methacrylate, glycidyl acrylate and glycidyl methacrylate.

The elastomer component to be employed for component (A) of the present invention, is required to have graft sites. Specifically, it preferably has carbon-carbon double bonds in the elastomer molecule.

There is no particular restriction as to the method for the polymerization of the above monomers. A known method such as emulsion polymerization or solution polymerization may be employed.

The elastomer component for component (A) may not necessarily be composed of a single kind, and may be a mixture of two or more elastomer components separately polymerized.

The monomer constituting the resin component of the elastomer-containing styrene resin as component (A) in the present invention, includes an aromatic vinyl monomer such as styrene, α-methylstyrene, vinyl toluene or t-butylstyrene; a vinyl cyanide monomer such as acrylonitrile or methacrylonitrile; a (meth)acrylate monomer such as methyl methacrylate, ethyl acrylate, butyl acrylate, hexyl acrylate or octyl acrylate; and a maleimide monomer such as maleimide, N-methylmaleimide, N-ethylmaleimide, N-propylmaleimide, N-cyclohexylmaleimide, N-phenylmaleimide, N-toluylmaleimide or N-xylylmaleimide. These monomers may be homopolymerized or copolymerized for use. However, it is essential to contain an aromatic vinyl monomer.

Component (A) used in the present invention comprises the elastomer component and the resin component as described above. Further it is essential that the covalent substance or bonding of the elastomer and resin components, which may be called a graft structure, is present at the interface between the elastomer component constituting a dispersed phase and the resin component constituting a continuous phase. It is known that such a structure is formed by a so-called graft polymerization method in which a part or whole of the monomer for the resin component is polymerized in the presence of an elastomer component. Likewise, component (A) of the present invention can be produced by a conventional graft polymerization technique.

The resin component for component (A) is required to have a glass transition temperature of higher than 20° C. If the glass transition temperature of the resin component is not higher than 20° C., the heat resistance or the rigidity of the thermoplastic resin composition tends to be low, such being undesirable.

Component (A) comprises the elastomer component and the resin component, as mentioned above, and it may be prepared by mixing a separately polymerized resin component to an elastomer-containing styrene resin obtained by polymerizing a monomer for the resin component in the presence of the elastomer component. Here, the separately polymerized resin component means a polymer of a vinyl monomer polymerized separately, and the vinyl monomer may be any one of the group of monomers as presented above as the monomer constituting the resin component. However, it should be noted here that the separately polymerized resin component may not necessarily have the same composition as the resin component obtained by the graft polymerization. For instance, a resin component obtained by copolymerizing acrylonitrile, styrene and o-methylstyrene may be mixed to an elastomer-containing styrene resin obtained by graft-polymerizing acrylonitrile, styrene and methyl methacrylate in the presence of a polybutadiene.

The separately polymerized resin component to be mixed to the elastomer-containing styrene resin, is required to have a glass transition temperature of higher than 20° C. If the glass transition temperature is not higher than 2020 C., the heat resistance or the rigidity of the thermoplastic resin composition tends to be low.

Specific examples of component (A) of the present invention, include a high impact polystyrene (butadiene-styrene) resin, an ABS (acrylonitrile-butadiene-styrene) resin, a heat resistant ABS (acrylonitrile-butadiene-styrene-60 -methylstyrene) resin, an AAS (acrylonitrile-acrylate-styrene) resin, an AES (acrylonitrile-ethylene-propylene-styrene) resin and a MBAS (methyl methacrylate-butadiene-acrylonitrile-styrene) resin.

The polycarbonate resin as component (B) of the present invention is a polymer material having carbonate bonds $$[-OROC-]$$
$$\phantom{[-OROC}\|$$
$$\phantom{[-OROCC}O$$

in the polymer main chain. It includes an aliphatic polycarbonate wherein R is a residue of an aliphatic dioxy compound, an aromatic aliphatic polycarbonate wherein R is a residue of an aliphatic dioxy compound containing an aromatic ring, and an aromatic polycarbonate wherein R is a residue of an aromatic dioxy compound. Further, modified polycarbonates including a co-polycarbonate obtained from two or more dioxy compounds as starting materials, and a hetero-bond copolymer containing carbonate bonds and other bonds such as ester bonds in the main chain, may also be used as component (B) of the present invention.

There is no particular restriction as to the method for the preparation of component (B) of the present invention. For instance, the condensation-polymerization of a dioxy compound with phosgene, the condensation polymerization of a dioxy compound with bischloroformate, the ester exchange of a dioxy compound with a carbonic acid diester compound, the condensation-polymerization of a dioxy compound, phosgene and a dibasic acid dichloride and the ester exchange of a dioxy compound, a carbonic acid diester compound and a dibasic acid diester, may be mentioned. However, the method is not restricted to these specific examples.

If the structure of the polycarbonate resin as component (B) of the present invention is represented by the dioxy compound as the starting material, specific examples of the starting dioxy compound for component (B) include an aliphatic diol such as

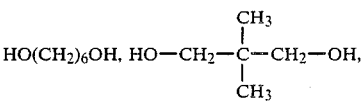

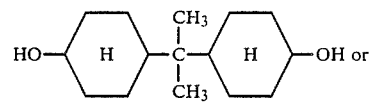

-continued

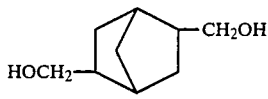

an aromatic aliphatic diol such as

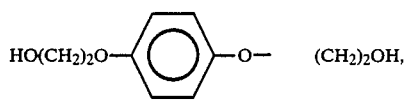

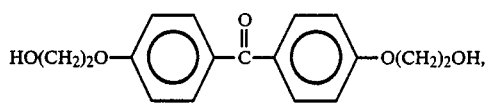

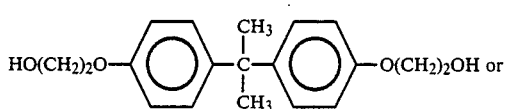

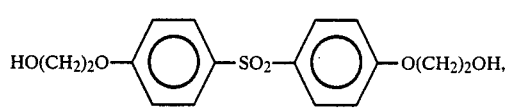

and a phenol such as

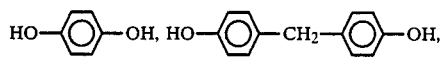

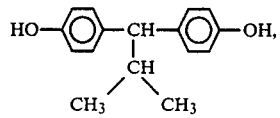

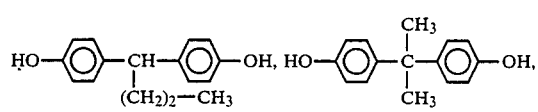

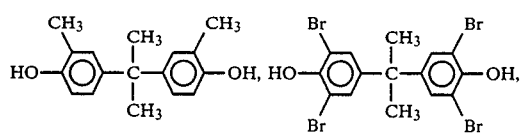

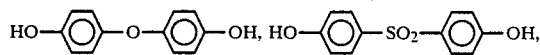

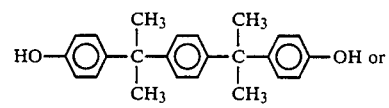

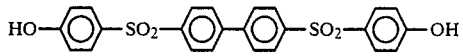

Polycarbonates, which are commercially readily available, are usually aromatic polycarbonates. In particular, a bisphenol polycarbonate of the formula

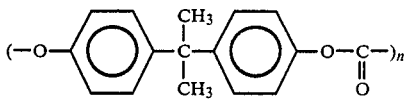

obtained from 2,2-bis-(4-oxyphenyl)propane i.e. so-called bisphenol A, as the starting material, is preferably employed in the present invention since it is readily available in the market. However, the polycarbonate for the purpose of the present invention is not restricted to such bisphenol A or aromatic polycarbonates.

The novelty of the present invention resides in that component (C) i.e. a polymer of a monomer containing an acrylate monomer, which has a solubility parameter of from 8.4 to 9.8 $(cal/cc)^{\frac{1}{2}}$, a glass transition temperature of not higher than 20° C. and a gel content of not higher than 70% by weight, is incorporated in a composition comprising components (A) and (B). The environmental stress cracking resistance of the obtained composition substantially reflects the influence of component (C). Namely, the characteristic effects of the present invention depend essentially on the nature and the amount of component (C) and can not be attained merely by restricting component (A) or (B) e.g. by restricting the molecular weight of component (A) or (B) to a certain range.

For the purpose of improving the environmental stress cracking resistance of the composition comprising components (A), (B) and (C), it is effective to increase the content of the elastomer component in component (A), to increase the molecular weight of the resin component of component (A), to increase the polar group content in the resin component of component (A) or to increase the molecular weight of component (B). According to the present invention, the physical property values of component (A) or (B) are not restricted in this respect. However, preferred physical properties of component (A) include an elastomer component content of from 2 to 80% by weight and a nitrile monomer content of from 3 to 50% by weight. Likewise, preferred physical properties of component (B) include a molecular weight of from $5 \times 10^3$ to $10^5$.

Component (C) of the present invention is obtained by polymerizing an acrylate monomer, or an acrylate monomer with another copolymerizable monomer. Here, the acrylate monomer includes methyl acrylate, ethyl acrylate, propyl acrylate, butyl acrylate, hexyl acrylate, cyclohexyl acrylate, octyl acrylate, decyl acrylate, dodecyl acrylate, tetradecyl acrylate, hexadecyl acrylate, octadecyl acrylate, hydroxyethyl acrylate, methoxyethyl acrylate, N,N-diethylaminoethyl acrylate, phenyl acrylate, benzyl acrylate and glycidyl acrylate. Said another copolymerizable monomer includes an aromatic vinyl monomer such as styrene, α-methylstyrene, t-butylstyrene or vinyl toluene; a vinyl cyanide monomer such as acrylonitrile or methacrylonitrile; a methacrylate monomer such as methyl methacrylate, ethyl methacrylate, butyl methacrylate, hydroxyethyl methacrylate, glycidyl methacrylate, N,N-diethylamino methacrylate or benzyl methacrylate; an olefin monomer such as ethylene, propylene, 1-butene, isobutylene or 2-butene; a vinyl ether monomer such as methyl vinyl ether, ethyl vinyl ether, butyl vinyl ether, phenyl vinyl ether or benzyl vinyl ether; acrylamide; methacrylamide; acrylic acid; and methacrylic acid.

Component (C) of the present invention may also be copolymerized with a polyfunctional vinyl monomer. As the polyfunctional vinyl monomer, there may be mentioned divinyl benzene, ethylene glycol di(meth)acrylate, 1,3-butylene glycol di(meth)acrylate, 1,4-butylene glycol di(meth)acrylate, propylene glycol di(meth)acrylate, triallyl cyanurate, triallyl isocyanurate, trimethylolpropane tri(meth)acrylate, allyl (meth)acrylate, vinyl (meth)acrylate, diethylene glycol di(meth)acrylate, triethylene glycol di(meth)acrylate, tetraethylene glycol di(meth)acrylate, pentaethylene glycol di(meth)acrylate, nonaethylene glycol di(meth)acrylate, tetradecaethylene glycol di(meth)acrylate, eicosaethylene glycol di(meth)acrylate, dipropylene glycol di(meth)acrylate, pentapropylene glycol di(meth)acrylate, nonapropylene glycol di(meth)acrylate, tetradecapropylene glycol di(meth)acrylate, eicosapropylene glycol di(meth)acrylate or 1,6-hexanediol di(meth)acrylate. Here, for instance, ethylene glycol di(meth)acrylate represents ethylene glycol diacrylate or ethylene glycol dimethacrylate.

Component (C) of the present invention is required to have a solubility perameter of from 8.4 to 9.8 (cal/cc)$^{\frac{1}{2}}$. A preferred range is from 8.6 to 9.6 (cal/cc)$^{\frac{1}{2}}$. In this specification, the solubility parameter means the solubility parameter values described in Polymer Handbook, Vol. 2, IV-337 to IV-359, edited by J. Brandrup and E. H. Immergut and published in 1975 by John Wirry and Sons Co., New York, U.S.A. The solubility parameter $\delta_T$ of the copolymer is calculated in accordance with the following formula I:

$$\delta_T = \sum_{n=1}^{m} \delta_n W_n / \sum_{n=1}^{m} W_n \; [(cal/CC)^{\frac{1}{2}}] \quad [I]$$

wherein $\delta_n$ is the solubility parameter of the homopolymer of each vinyl monomer constituting the copolymer made of m types of vinyl monomers, and $W_n$ is the weight fraction.

For instance, if the solubility parameters of poly(butyl acrylate) and poly(ethyl acrylate) are 8.8 (cal/cc)$^{\frac{1}{2}}$ and 9.4 (cal/cc)$^{\frac{1}{2}}$, respectively, the solubility parameter of a copolymer comprising 70% by weight of poly-butyl acrylate and 30% by weight of poly-ethyl acrylate is calculated to be 9.0 (cal/cc)$^{\frac{1}{2}}$.

If the solubility parameter of component (C) is less than 8.4 or more than 9.8, the environmental stress cracking resistance of the resin composition of the present invention tends to be low, such being undesirable.

Component (C) of the present invention is required to have a glass transition temperature of not higher than 20° C., preferably not higher than 10° C. If the glass transition temperature exceeds 20° C., the environmental stress cracking resistance of the resin composition tends to be low, such being undesirable.

Further, component (C) of the present invention is required to have a gel content of not higher than 70% by weight. In the present specification, the gel content is determined by accurately measuring the weight $S_0$ (g) of component (C) of about 1.0 g, placing it in a cage made of a 400 mesh stainless steel net, immersing it in 100 g of toluene at 5° C. for 24 hours, then after withdrawing the cage, air drying it at room temperature, measuring the weight $S_1$ (g) of the insoluble of component (C), and then calculating the gel content in accordance with the following formula II:

$$(S_1/S_0) \times 100 \; (\%) \quad [II]$$

If the gel content of component (C) exceeds 70% by weight, the environmental stress cracking resistance of the resin composition of the present invention tends to be low, such being undesirable.

There is no particular restriction as to the method for the polymerization of component (C) of the invention. However, it is most advantageous to employ emulsion polymerization for industrial production, and conventional techniques for emulsion polymerization may suitably be employed.

According to the present invention, from 5 to 94% by weight of component (A), from 5 to 94% by weight of component (B) and from 0.1 to 20% by weight of component (C) are mixed. If the amount of component (A) is less than 5% by weight or if the amount of component (B) exceeds 94% by weight, the molding processability of the resulting composition tends to be inadequate. On the other hand, if the amount of component (A) exceeds 94% by weight or if the amount of component (B) is less than 5% by weight, the impact resistance or heat resistance of the resulting composition tends to be inadequate, such being undesirable. Further, if the amount of component (C) is less than 0.1% by weight, the environmental stress cracking resistance of the resulting composition tends to be inadequate, and if the amount exceeds 20% by weight, the rigidity or the heat resistance of the composition tends to be low.

There is no particular restriction as to the method for mixing components (A), (B) and (C). With respect to the specific manner of operation, for example, in the case where components (A) and (C) are both produced by emulsion polymerization, the composition may be prepared by mixing a latex of component (A) and a latex of component (C) in the latex state, followed by an operation such as precipitation to isolate a solid mixture, and then mixing the solid mixture with component (B) in a solid state. Otherwise, the composition may be obtained by mixing solid component (C) with solid component (A) and solid component (B). For the mixing, a melt-kneading apparatus can be used, and there is no particular restriction as to such a melt-kneading apparatus. For instance, a Bumbury's mixer, an intensive mixer, a mixtruder, co-kneader, an extruder and rolls may be mentioned. It is also possible to employ a method disclosed in Japanese Unexamined Patent Publication No. 131656/1981.

A more preferred process for preparing the thermoplastic resin composition of the present invention, comprises mixing from 10 to 80% by weight (as solid content of polymer) of an emulsion of polymer component (C) and from 20 to 90% by weight (as solid content of polymer) of an emulsion of component (D) a polymer of a vinyl monomer, which has a glass transition temperature of higher than 20° C., a gel content of not higher than 10%, a solubility parameter of from 9.0 to 11.0 (cal/cc)$^{\frac{1}{2}}$ and a weight average molecular weight, based on polystyrene, of at least $2 \times 10^5$, in an emulsion state, followed by the separation of the polymer, and mixing the polymer composition (E) thus obtained with components (A) and (B).

The vinyl monomer for polymer component (D), includes an aromatic vinyl monomer such as styrene, α-methylstyrene, vinyl toluene, t-butylstyrene, cyanostyrene or chlorostyrene; a vinyl cyanide monomer such as acrylonitrile or methacrylonitrile; an acrylate monomer such as methyl acrylate, ethyl acrylate, butyl acrylate, hexyl acrylate, cyclohexyl acrylate, octyl acrylate, decyl acrylate, octadecyl acrylate, hydroxyethyl acrylate, methoxyethyl acrylate, glycidyl acrylate or phenyl acrylate; a methacrylate monomer such as methyl methacrylate, ethyl methacrylate, butyl methacrylate, hexyl methacrylate, cyclohexyl methacrylate, octyl methacrylate, decyl methacrylate, octadecyl methacrylate, hydroxyethyl methacrylate, methoxyethyl methacrylate, glycidyl methacrylate or phenyl methacrylate; an amide monomer such as acrylamide or methacrylamide; an unsaturated carboxylic acid monomer such as acrylic acid, methacrylic acid or itaconic acid; a vinyl halide monomer such as vinyl chloride or vinylidene chloride; an aliphatic vinyl ester monomer such as vinyl formate, vinyl acetate, vinyl propionate, vinyl decanate or vinyl octadecanate; an olefin monomer such as ethylene, propylene, 1-butene, isobutylene or 2-butene; a maleimide monomer such as maleimide, N-methyl maleimide, N-ethyl maleimide, N-propyl maleimide, N-cyclohexyl maleimide, N-phenyl maleimide or N-toluyl maleimide; an acid anhydride monomer such as maleic anhydride; a conjugated diene monomer such as butadiene, isoprene or chloroprene; a vinyl ether monomer such as methyl vinyl ether, ethyl vinyl ether, propyl vinyl ether, hexyl vinyl ether, decyl vinyl ether, octadecyl vinyl ether, phenyl vinyl ether, cresyl vinyl ether or glycidyl vinyl ether; a vinyl ketone monomer such as methyl vinyl ketone or phenyl vinyl ketone; and vinyl pyridine. However, the vinyl monomer is not restricted to these specific examples.

The vinyl monomer for polymer component (D) of the present invention may be a polyfunctional vinyl monomer. The polyfunctional vinyl monomer includes divinyl benzene, ethylene glycol di(meth)acrylate, 1,3-butylene glycol di(meth)acrylate, 1,4-butylene glycol di(meth)acrylate, propylene glycol di(meth)acrylate, triallyl cyanurate, triallyl isocyanurate, trimethylol propane tri(meth)acrylate, allyl (meth)acrylate, vinyl (meth)acrylate, diethylene glycol (meth)acrylate, triethylene glycol di(meth)acrylate, tetraethylene glycol di(meth)acrylate, pentaethylene glycol di(meth)acrylate, nonaethylene glycol di(meth)acrylate, tetradecaethylene glycol di(meth)acrylate, eicosaethylene glycol di(meth)acrylate, dipropylene glycol di(meth)acrylate, pentapropylene glycol di(meth)acrylate, nonapropylene glycol di(meth)acrylate, tetradecapropylene glycol di(meth)acrylate, eicosapropylene glycol di(meth)acrylate and 1,6-hexanediol di(meth)acrylate. Here, for example, ethylene glycol di(meth)acrylate represents ethylene glycol diacrylate or ethylene glycol dimethacrylate.

The polymer of component (D) of the present invention is required to have a glass transition temperature of higher than 20° C. A preferred glass transition temperature is at least 30° C. If the glass transition temperature of the polymer for component (D) is not higher than 20° C., it is difficult to handle the polymer composition (E) prepared by mixing the polymer of component (C) and the polymer component (D) in the form of a powder or pellets, and such is industrially disadvantageous. Further, when mixed with components (A) and (B), it tends to substantially lower the heat resistance, such being undesirable.

The polymer of component (D) of the present invention is required to have a solubility parameter within a range of from 9.0 to 11.0 $(cal/cc)^{\frac{1}{2}}$. A preferred range is from 9.5 to 10.5 $(cal/cc)^{\frac{1}{2}}$. If the polymer composition (E) prepared by mixing a polymer of component (D) with the solubility parameter being outside the range of the present invention with the polymer of component (C), is mixed with an elastomer-containing styrene resin and a polycarbonate resin to obtain a thermoplastic resin composition, a lamellar peeling phenomenon or a surface defect phenomenon such as a flow mark, is likely to appear on the molded product.

The polymer of component (D) of the present invention is required to have a weight average molecular weight, based on polystyrene, of at least $2 \times 10^5$. If the polymer composition E prepared by mixing a polymer of component (D) having a weight average molecular weight, based on polystyrene of less than $2 \times 10^5$, with a polymer of component (C), is mixed with the elastomer-containing styrene resin and the polycarbonate resin to obtain a thermoplastic resin composition, a lamellar peeling phenomenon or a surface defect phenomenon such as a flow mark tends to appear on the molded product prepared from such a composition, such being undesirable.

In this specification, the weight average molecular weight based on polystyrene means a weight average molecular weight obtained by gel permeation chromatography on the assumption that the polymer of component (D) is polystyrene. Namely, by using a polystyrene having a narrow molecular weight distribution and a known molecular weight as a standard substance, a calibration curve is prepared from the relation between the molecular weight and the elution peak volume of the gel permeation chromatogram. Then, the gel permeation chromatogram of the polymer of component (D) is measured, and the molecular weight is determined from the elution volume by means of the above calculation curve, and the weight average molecular weight is calculated in accordance with a usual method.

The polymer of component (D) of the present invention is required to have a gel content of not higher than 10%.

The gel content of component (D) is obtained by the same measurement as in the measurement of the gel content of the polymer of component (C) except that 100 g of methyl ethyl ketone is used instead of toluene as the solvent, and calculating the gel content in accordance with the formula II.

If the polymer composition (E) prepared by mixing a polymer of component (D) having a gel content exceeding 10%, with a polymer of component (C), is mixed with the elastomer-containing styrene resin and the polycarbonate resin to obtain a thermoplastic resin composition, the resulting molded product tends to be inferior in the gloss, such being undesirable.

There is no particular restriction as to the method for the preparation of the polymer of component (D) of the present invention. Conventional methods such as emulsion polymerization, suspension polymerization, solution polymerization and bulk polymerization, may suitably be employed. Emulsion polymerization is industrially most advantageous, because according to the present invention, the polymer of component (C) and the polymer of component (D) are mixed in an emulsion state, and according to the emulsion polymerization, a polymer having a high molecular weight can easily be produced on an industrial scale.

For the preparation of the polymer of component (D) of the present invention, the vinyl monomer may be selected optionally so long as the glass transition temperature, the gel content, the solubility parameter and the weight average molecular weight of the resulting polymer of component (D) satisfy the requirements of the present invention.

A chain transfer agent may be employed for the purpose of controlling the molecular weight of the polymer of component (C) or the polymer of component (D). In particular, in a case where a multifunctional vinyl monomer is copolymerized, it is possible to obtain a polymer having a branched structure and a low gel content by using a chain transfer agent.

There is no particular restriction as to the chain transfer agent to be used. For instance, octyl mercaptan, decyl mercaptan, thioglycolic acid, ethyl thioglycolate, butyl thioglycolate, ethyl o-mercaptobenzoate, 1-naphthyl disulfide, a sulfur compound such as sulfur, a halogen compound such as carbon tetrabromide, a hydrocarbon such as limonene or terpinolene, a nitro compound such as nitrophenol or trinitrobenzene, and benzoquinone, may be mentioned.

According to the present invention, from 20 to 90% by weight of the polymer of component (D) and from 10 to 80% by weight of the polymer of component (C) are mixed to obtain a polymer composition (E). If the content of the polymer of component (C) is less than 10% by weight, the environmental stress cracking resistance of a thermoplastic resin composition prepared by mixing said polymer composition (E) with the elastomer-containing styrene resin and the polycarbonate resin, tends to be poor, and if it exceeds 80% by weight, a lamellar peeling phenomenon or a surface defect phenomenon such as a flow mark tends to appear on the molded product prepared from such a thermoplastic resin composition.

According to the present invention, an emulsion of the polymer of component (C) and an emulsion of the polymer of component (D) are mixed in an emulsion state. When the polymer of component (C) or the polymer of component (D) is produced by emulsion polymerization, the polymerization solution obtained by the emulsion polymerization can be used by itself. If they are produced by other polymerization methods, a step of emulsifying such polymers is required.

There is no particular restriction as to the method for emulsifying the polymers, and any conventional method may be employed. For instance, there may be mentioned a method wherein a polymer solution is mixed with an emulsifier and water and stirred to obtain an emulsion, followed by removing the solvent, a method wherein a fine powder obtained by pulverizing a polymer is mixed and stirred together with an emulsifier and water to obtain an emulsion, or a method wherein a polymer is pulverized in the presence of an emulsifier and water to obtain an emulsion. The emulsifying method is not restricted to these specific examples.

There is no particular restriction as to the particle size of the polymer in the emulsion of the polymer of component (C) or of the polymer of component (D). However, the surface area average particle size is preferably not larger than 5 μm. Here, the surface area average particle size is obtained by taking an electron microscopic photograph of the emulsion and calculating it in accordance with the following formula III on the basis that the ratio of a particle size $d_i$ is $f_i$.

$$\Sigma f_i d_i^3 / \Sigma f_i d_i^2 \qquad [\text{III}]$$

If the surface area average particle size of the polymer of component (C) exceeds 5 μm, when a polymer composition (E) obtained by mixing such a polymer of component (C) with the polymer of component (D), is mixed to the elastomer-containing styrene resin and the polycarbonate resin to obtain a thermoplastic resin composition, a lamellar peeling phenomenon or a flow mark is likely to appear on a molded product of such thermoplastic resin composition.

There is no particular restriction to the type of the emulsifier to be used for the emulsion polymerization for the polymer of component (C) or for the polymer of component (D), or to be used for emulsification of the polymers. An anionic surfactant, a cationic surfactant, an amphoteric surfactant or a nonionic surfactant may optionally be employed. However, the anionic surfactant may most advantageously be used.

There is no particular restriction as to the method for mixing the emulsion of the polymer of component (C) and the emulsion of the polymer of component (D). The mixing may be conducted by using an apparatus such as a fixed container-type mixing apparatus, a rotary container-type mixing apparatus, a pipe line mixer or a static mixer.

There is no particular restriction as to the method for separating the polymer composition (E) from the emulsion mixture comprising the emulsion of the polymer of component (C) and the emulsion of the polymer of component (D). There may be mentioned a method wherein a precipitating agent e.g. an acid such as hydrochloric acid, sulfuric acid, phosphoric acid or acetic acid; an electrolyte such as sodium chloride, potassium chloride, aluminum chloride, sodium sulfate or magnesium sulfate; or a water soluble polymer such as a polyvinyl alcohol, a polyethylene glycol, a polyethylene glycol-polypropylene glycol block copolymer or a carboxymethyl cellulose, is added to the emulsion, a method wherein the emulsion is freezed for demulsification, or a method wherein the emulsion is sprayed in a high temperature gas.

The polymer composition (E) separated from the mixture of the emulsion of the polymer of component (C) and the emulsion of the polymer of component (D), may be supplied to a melt-kneading apparatus for melt-kneading. The melt-kneading apparatus to be employed, includes a Bumbury's mixer, an intensive mixer, a mixtruder, a co-kneader, an extruder and rolls. Further, it is possible to employ a melt-kneading apparatus having a dehydration mechanism, as disclosed in Japanese Examined Patent Publication No. 37021/1984. If this apparatus is employed, the emulsion and the precipitating agent may continuously be supplied to this apparatus, and the mixing, demulsification, dehydration, drying and melt-kneading may continuously be conducted in the same apparatus.

According to the process of the present invention, from 0.5 to 50% by weight of the polymer composition (E), from 5 to 94% by weight of the elastomer-containing styrene resin and from 5 to 94% by weight of the polycarbonate resin, are mixed to obtain a thermoplastic resin composition. Preferably, from 2 to 40% by weight of the polymer composition (E), from 5 to 90% by weight of the elastomer-containing styrene resin and from 5 to 90% by weight of the polycarbonate resin, are mixed. If the amount of the polymer composition (E) is less than 0.5% by weight, the resulting thermoplastic resin composition tends to have poor environmental stress cracking resistance, and if it exceeds 50% by weight, the rigidity, the heat resistance or the impact resistance tends to be inferior. If the amount of the elastomer-containing styrene resin is less than 5% by weight, the molding processability tends to be poor, and if it exceeds 94% by weight, the impact resistance or the heat resistance tends to be inferior. Likewise, if the amount of the polycarbonate resin is less than 5% by weight, the impact resistance or the heat resistance tends to be poor, and if it exceeds 94% by weight, the molding processability tends to be inferior.

According to the present invention, the polymer composition (E), the elastomer-containing styrene resin and the polycarbonate resin are mixed to obtain a thermoplastic resin composition. There is no particular restriction as to the mixing method, and the components may be mixed in the form of powders or pellets to obtain the desired thermoplastic resin composition. As the mixing apparatus, there may be mentioned a fixed container-type mixing apparatus such as a Henschel mixer, and a rotary container-type mixing apparatus such as a V-type blender or a tumbler. However, the mixing apparatus is not restricted to such specific examples. As the method for mixing the components, there may be mentioned a melt-kneading. Specific examples of the melt-kneading apparatus to be employed, include a Bumbury's mixer, an intensive mixer, a mixtruder, a co-kneader, an extruder and rolls. As the practical method for the melt-kneading, there may be mentioned a method wherein the polymer composition (E), the elastomer-containing styrene resin and the polycarbonate resin are simultaneously supplied to a melt-kneading apparatus, a method wherein the polymer composition (E) and the elastomer-containing styrene resin are melt-kneaded to obtain a solid, which is then melt-kneaded with the polycarbonate resin, or a method wherein the elastomer-containing styrene resin and the polycarbonate resin are melt-kneaded to obtain a solid, which is then melt-kneaded with the polymer composition (E).

Now, the present invention will be described in further detail with reference to Examples. However, it should be understood that the present invention is by no means restricted to these specific Examples. In the following Examples, "parts" and "%" means "parts by weight" and "% by weight", respectively.

EXAMPLE 1 and COMPARATIVE EXAMPLE 1

Preparation of component (D): Preparation of D-1 to D-19

Into an autoclave, 150 parts of pure water and 2 parts of potassium stearate were charged and heated to 50° C. under stirring. An aqueous solution obtained by dissolving 0.005 part of ferric sulfate heptahydrate, 0.01 part of tetrasodium ethylenediamine tetraacetate dihydrate and 0.3 part of sodium formaldehyde sulfoxylate dihydrate in 10 parts of pure water, was poured thereto.

Then, 100 parts of a monomer mixture having a composition as shown in Table 1, was continuously added over a period of 4 hours. At the same time, an aqueous solution obtained by dissolving 0.05 part of potassium persulfate in 25 parts of pure water, was continuously added over a period of 6 hours.

After the completion of the addition of the monomer mixture, 0.1 part of diisopropylbenzene hydroperoxide was added, and the system was heated to 70° C. and further stirred for 2 hours to complete the polymerization.

The characteristics of component (D) thus obtained, are shown in Table 2.

Preparation of component (D): Preparation of D-20 to D-22

Into an autoclave, 175 parts of pure water and 2 parts of potassium stearate were charged, and heated to 70° C. under stirring.

An aqueous solution obtained by dissolving 0.05 part of potassium persulfate in 10 parts of pure water, was poured thereto, and 100 parts of a monomer mixture having a composition as shown in Table 1, was continuously added thereto over a period of 4 hours.

After the completion of the addition of the monomer mixture, 0.1 part of lauroyl peroxide was added, and the reaction system was stirred at 70° C. for further 2 hours to complete the polymerization.

The characteristics of component (D) thus obtained are shown in Table 2.

Preparation of component (D): Preparation of D-23

Into an autoclave, 175 parts of pure water and 2 parts of potassium stearate were charged, and heated to 50° C. under stirring. An aqueous solution obtained by dissolving 0.005 part of ferric sulfate heptahydrate, 0.01 part of tetrasodium ethylenediamine tetraacetate dihydrate and 0.3 part of sodium formaldehyde sulfoxylate dihydrate in 10 parts of pure water, was poured thereto.

Then, a solution mixture obtained by dissolving 0.2 part of diisopropylbenzene hydroperoxide in 100 parts of a monomer mixture having a composition as shown in Table 1, was continuously added over a period of 5 hours.

After the completion of the addition of the monomer mixture, 0.1 part of diisopropylbenzene hydroperoxide was added, and the system was heated to 70° C. and stirred for further 2 hours to complete the polymerization.

The characteristics of component (D) thus obtained are shown in Table 2.

Preparation of component (C): Except for C-15 and C-27

Into an autoclave, 120 parts of pure water and 2 parts of sodium dodecylbenzene sulfonate were charged, and heated to 65° C. under stirring. An aqueous solution obtained by dissolving 0.005 part of ferric sulfate heptahydrate, 0.01 part of tetrasodium ethylenediamine tetraacetate dihydrate and 0.3 part of sodium formaldehyde sulfoxylate dihydrate in 10 parts of pure water, was poured thereto.

Then, 20% of 100 parts of the monomer mixture having a composition as shown in Table 3, was poured into the autoclave, and 2.5 parts of an aqueous solution containing 0.2% of potassium persulfate was added to initiate the polymerization.

When the polymerization started, the rest of the above-mentioned monomer mixture was continuously added over a period of 4 hours. Further, when the polymerization started, an aqueous solution obtained by dissolving 0.05 part of potassium persulfate in 20 parts of pure water, was continuously added over a period of 6 hours. After the completion of the addition of the aqueous potassium persulfate solution, the content of the autoclave was cooled to complete the polymerization.

The characteristics of component (C) thus obtained are shown in Table 4.

Preparation of component (C): Preparation of C-15 and C-27

Into an autoclave, 140 parts of pure water and 2 parts of sodium dodecylbenzene sulfonate were charged, and heated to 70° C. under stirring.

An aqueous solution obtained by dissolving 0.05 part of potassium persulfate in 10 parts of pure water, was poured thereto, and 100 parts of a monomer mixture having a composition as identified in Table 3, was continuously added thereto over a period of 4 hours.

After the completion of the addition of the monomer mixture, 0.1 part of diisopropylbenzene hydroperoxide was added, and the system was stirred for further 2 hours at 70° C. to complete the polymerization.

The characteristics of component (C) thus obtained are shown in Table 4.

The abbreviations for the long chain bifunctional monomers used in Table 3 are as follows:
9G: Nonaethylene glycol dimethacrylate
14G: Tetradecaethylene glycol dimethacrylate
9PG: Nonapropylene glycol dimethacrylate
9AG: Nonaethylene glycol diacrylate Preparation of polymer composition (E)

50 parts (as solid content of polymer) of an emulsion of component (C) and 50 parts (as solid content of polymer) of an emulsion of component (D) were mixed in an emulsion state, and a 10% aqueous solution of 0.7 part of a polyethylene glycol-polypropylene glycol block copolymer (weight ratio of ethylene oxide in the total molecules: 80%, the molecular weight of polypropylene glycol: 1750, Pluronic F-68, manufactured by Asahi Denka Kogyo K.K.) was added thereto.

An aqueous solution obtained by dissolving 5 parts of calcium chloride dihydrate in 400 parts of pure water, was heated to from 80° to 95° C. and the above emulsion mixture was poured thereto under stirring for precipitation.

The slurry thus obtained was filtered, washed with water and dried in an atmosphere of 70° C. to obtain a polymer composition E.

The physical property values were obtained in accordance with the following methods.

(1) Glass transition temperature

A solid obtained by dropping an emulsion of component (C) or (D) into methanol, was dried, and the glass transition temperature was measured by 910 differential scanning calorimeter and 990 thermal analyzer i.e. DuPont's system measuring devices.

(2) Gel content

A solid obtained by dropping an emulsion of component (C) or (D) into methanol, was dried. About 1.0 g thereof was accurately weighed. The measurements were conducted in the above disclosed method and calculated in accordance with the formula II. However, the solvent used was different as between component (C) and component (D). Namely, methyl ethyl ketone was used for component (D), whereas toluene was used for component (C).

(3) Solubility parameter

The solubility parameter values [unit: $(cal/cc)^{\frac{1}{2}}$] of the polymers used for the calculation of the solubility parameters in the Examples, were as follows.

| | |
|---|---|
| Poly(butyl acrylate): | 8.8 |
| Poly(ethyl acrylate): | 9.4 |
| Poly(methyl methacrylate): | 9.5 |
| Polyacrylonitrile: | 12.5 |
| Polystyrene: | 9.1 |
| Poly(vinyl toluene): | 8.9 |
| Poly(t-butylstyrene): | 7.9 |

(4) Weight average molecular weight

Two GMH-6 type columns manufactured by Toyo Soda Manufacturing Co., Ltd., were connected in series to HLC-802A type gel permeation chromatography manufactured by Toyo Soda Manufacturing Co., Ltd., and the measurement was conducted. As the detector, a refractometer was used, and as the solvent, tetrahydrofuran was used. When this apparatus is used, the upper limit for the measurement of the weight average molecular weight is $6 \times 10^5$, and a sample having an weight average molecular weight exceeding $6 \times 10^5$ was indicated by >6 in Table 1.

As the sample, a solid obtained by precipitating an emulsion of component (D) in methanol, was employed.

TABLE 1

| Sample No. | Styrene (parts) | Acrylonitrile (parts) | Methyl methacrylate (parts) | Vinyl toluene (parts) | t-Butyl-styrene (parts) | n-Butyl acrylate (parts) | Ethyl acrylate (parts) | Ethylene glycol dimethacrylate (parts) | t-Dodecyl mercaptan (parts) |
|---|---|---|---|---|---|---|---|---|---|
| D-1 | 75 | 25 | 0 | 0 | 0 | 0 | 0 | 0 | 0 |
| D-2 | 75 | 25 | 0 | 0 | 0 | 0 | 0 | 0 | 0.05 |
| D-3 | 75 | 25 | 0 | 0 | 0 | 0 | 0 | 0 | 0.10 |
| D-4 | 75 | 25 | 0 | 0 | 0 | 0 | 0 | 0 | 0.20 |
| D-5 | 65 | 35 | 0 | 0 | 0 | 0 | 0 | 0 | 0 |
| D-6 | 0 | 30 | 70 | 0 | 0 | 0 | 0 | 0 | 0 |
| D-7 | 0 | 20 | 80 | 0 | 0 | 0 | 0 | 0 | 0 |
| D-8 | 0 | 10 | 90 | 0 | 0 | 0 | 0 | 0 | 0 |
| D-9 | 0 | 5 | 95 | 0 | 0 | 0 | 0 | 0 | 0 |
| D-10 | 0 | 30 | 0 | 70 | 0 | 0 | 0 | 0 | 0 |
| D-11 | 0 | 30 | 0 | 0 | 70 | 0 | 0 | 0 | 0 |
| D-12 | 35 | 30 | 0 | 0 | 0 | 35 | 0 | 0 | 0 |
| D-13 | 35 | 30 | 0 | 0 | 0 | 0 | 35 | 0 | 0 |
| D-14 | 75 | 25 | 0 | 0 | 0 | 0 | 0 | 0.10 | 0.10 |
| D-15 | 0 | 20 | 30 | 0 | 0 | 50 | 0 | 0 | 0 |

TABLE 1-continued

| Sample No. | Styrene (parts) | Acrylonitrile (parts) | Methyl methacrylate (parts) | Vinyl toluene (parts) | t-Butyl-styrene (parts) | n-Butyl acrylate (parts) | Ethyl acrylate (parts) | Ethylene glycol dimethacrylate (parts) | t-Dodecyl mercaptan (parts) |
|---|---|---|---|---|---|---|---|---|---|
| D-16 | 75 | 25 | 0 | 0 | 0 | 0 | 0 | 0 | 0.5 |
| D-17 | 75 | 25 | 0 | 0 | 0 | 0 | 0 | 0 | 1.0 |
| D-18 | 0 | 15 | 0 | 0 | 85 | 0 | 0 | 0 | 0 |
| D-19 | 0 | 55 | 45 | 0 | 0 | 0 | 0 | 0 | 0 |
| D-20 | 75 | 25 | 0 | 0 | 0 | 0 | 0 | 1.0 | 0 |
| D-21 | 75 | 25 | 0 | 0 | 0 | 0 | 0 | 0 | 0 |
| D-22 | 75 | 25 | 0 | 0 | 0 | 0 | 0 | 0 | 0.05 |
| D-23 | 75 | 25 | 0 | 0 | 0 | 0 | 0 | 0 | 0 |

TABLE 2

| Sample No. | Glass transition temperature (°C.) | Gel content (%) | Solubility parameter $(cal/cc)^{\frac{1}{2}}$ | Weight average molecular weight ($\times 10^5$) |
|---|---|---|---|---|
| D-1 | 106 | 0 | 10.0 | >6 |
| D-2 | 105 | 0 | 10.0 | 3.5 |
| D-3 | 106 | 0 | 10.0 | 2.9 |
| D-4 | 105 | 0 | 10.0 | 2.2 |
| D-5 | 106 | 0 | 10.3 | >6 |
| D-6 | 84 | 0 | 10.4 | >6 |
| D-7 | 89 | 0 | 10.1 | >6 |
| D-8 | 96 | 0 | 9.8 | 5.2 |
| D-9 | 103 | 0 | 9.7 | 5.0 |
| D-10 | 113 | 0 | 10.0 | >6 |
| D-11 | 127 | 0 | 9.3 | >6 |
| D-12 | 38 | 0 | 10.0 | >6 |
| D-13 | 66 | 0 | 10.2 | >6 |
| D-14 | 106 | 0 | 10.0 | >6 |
| D-15 | 4 | 0 | 9.8 | >6 |
| D-16 | 104 | 0 | 10.0 | 1.1 |
| D-17 | 103 | 0 | 10.0 | 0.58 |
| D-18 | 133 | 0 | 8.6 | >6 |
| D-19 | 72 | 0 | 11.2 | >6 |
| D-20 | 106 | 94 | 10.0 | Not measurable |
| D-21 | 105 | 0 | 10.0 | >6 |
| D-22 | 105 | 0 | 10.0 | 3.7 |
| D-23 | 106 | 0 | 10.0 | 3.0 |

TABLE 3

| Sample No. | n-Butyl acrylate (parts) | Ethyl acrylate (parts) | Methyl methacrylate (parts) | Acrylonitrile (parts) | Styrene (parts) | t-Dodecyl mercaptan (parts) | Ethylene glycol dimethacrylate (parts) | Type of long chain bifunctional monomer | Amount of long chain bifunctional monomer (parts) |
|---|---|---|---|---|---|---|---|---|---|
| C-1 | 70 | 0 | 30 | 0 | 0 | 0 | 0 | Nil | 0 |
| C-2 | 70 | 0 | 30 | 0 | 0 | 0.1 | 0 | Nil | 0 |
| C-3 | 70 | 0 | 30 | 0 | 0 | 0.1 | 0.1 | Nil | 0 |
| C-4 | 70 | 0 | 30 | 0 | 0 | 0 | 0 | 9G | 0.5 |
| C-5 | 70 | 0 | 30 | 0 | 0 | 0 | 0 | 14G | 1.0 |
| C-6 | 70 | 0 | 30 | 0 | 0 | 0 | 0 | 9PG | 0.5 |
| C-7 | 70 | 0 | 30 | 0 | 0 | 0.1 | 0.1 | 9PG | 0.75 |
| C-8 | 70 | 0 | 30 | 0 | 0 | 0.1 | 0.1 | 9AG | 0.75 |
| C-9 | 70 | 0 | 24 | 6 | 0 | 0 | 0 | Nil | 0 |
| C-10 | 70 | 0 | 10 | 20 | 0 | 0 | 0 | Nil | 0 |
| C-11 | 70 | 0 | 10 | 0 | 20 | 0 | 0 | Nil | 0 |
| C-12 | 70 | 0 | 0 | 0 | 30 | 0 | 0 | Nil | 0 |
| C-13 | 60 | 0 | 0 | 0 | 40 | 0 | 0 | Nil | 0 |
| C-14 | 50 | 0 | 50 | 0 | 0 | 0 | 0 | Nil | 0 |
| C-15 | 70 | 0 | 30 | 0 | 0 | 0 | 0.37 | 9PG | 1.0 |
| C-16 | 50 | 50 | 0 | 0 | 0 | 0 | 0 | Nil | 0 |
| C-17 | 50 | 50 | 0 | 0 | 0 | 0 | 0.1 | Nil | 0 |
| C-18 | 50 | 50 | 0 | 0 | 0 | 0.1 | 0.1 | Nil | 0 |
| C-19 | 50 | 50 | 0 | 0 | 0 | 0.1 | 0.1 | 9PG | 0.75 |
| C-20 | 40 | 60 | 0 | 0 | 0 | 0 | 0 | Nil | 0 |
| C-21 | 20 | 80 | 0 | 0 | 0 | 0 | 0 | Nil | 0 |
| C-22 | 20 | 74 | 0 | 6 | 0 | 0 | 0 | Nil | 0 |
| C-23 | 100 | 0 | 0 | 0 | 0 | 0 | 0 | Nil | 0 |
| C-24 | 0 | 100 | 0 | 0 | 0 | 0 | 0 | Nil | 0 |
| C-25 | 30 | 0 | 70 | 0 | 0 | 0 | 0 | Nil | 0 |
| C-26 | 70 | 0 | 0 | 30 | 0 | 0 | 0 | Nil | 0 |
| C-27 | 70 | 0 | 30 | 0 | 0 | 0 | 0.5 | Nil | 0 |
| C-28 | 70 | 0 | 30 | 0 | 0 | 0 | 0.5 | Nil | 0 |

TABLE 4

| Sample No. | Glass transition temperature (°C.) | Gel content (%) | Solubility parameter $(cal/cc)^{\frac{1}{2}}$ |
|---|---|---|---|
| C-1 | −18 | 0.15 | 9.0 |
| C-2 | −19 | 0.10 | 9.0 |
| C-3 | −18 | 0.63 | 9.0 |
| C-4 | −18 | 0.93 | 9.0 |
| C-5 | −19 | 0.79 | 9.0 |
| C-6 | −18 | 0.31 | 9.0 |
| C-7 | −18 | 0.19 | 9.0 |
| C-8 | −18 | 0.25 | 9.0 |
| C-9 | −12 | 2.67 | 9.2 |
| C-10 | −10 | 4.57 | 9.6 |
| C-11 | −10 | 0.84 | 8.9 |
| C-12 | −6 | 0.46 | 8.9 |
| C-13 | 1 | 1.12 | 8.9 |
| C-14 | 4 | 0.94 | 9.2 |

TABLE 4-continued

| Sample No. | Characteristics | | |
|---|---|---|---|
| | Glass transition temperature (°C.) | Gel content (%) | Solubility parameter $(cal/cc)^{\frac{1}{2}}$ |
| C-15 | −16 | 47 | 9.0 |
| C-16 | −17 | 0.70 | 9.1 |
| C-17 | −16 | 0.48 | 9.1 |
| C-18 | −16 | 0.39 | 9.1 |
| C-19 | −16 | 0.42 | 9.1 |
| C-20 | −15 | 0.86 | 9.2 |
| C-21 | −15 | 0.62 | 9.3 |
| C-22 | −13 | 1.59 | 9.5 |
| C-23 | −47 | 0.13 | 8.8 |
| C-24 | −17 | 0.73 | 9.4 |
| C-25 | 52 | 3.07 | 9.3 |
| C-26 | −8 | 19.8 | 9.9 |
| C-27 | −18 | 82 | 9.0 |
| C-28 | −18 | 6.10 | 9.0 |

Preparation of thermoplastic resin composition 28 parts of an ABS resin powder comprising 50% of polybutadiene, 13% of acrylonitrile and 37% of styrene, 22 parts of an AS resin powder (weight average molecular weight based on polystyrene: $1.1 \times 10^5$) comprising 30% of acrylonitrile and 70% of styrene, 20 parts of a powder of the polymer composition (E) and 0.5 part of 4,4'-isopropylidene bis[monophenyl-dialkyl($C_{12}$–$C_{15}$) phosphite] (MARK 1500, manufactured by Adeca Argus Kagaku K.K.), were mixed by a Henschel mixer, and supplied to a single screw extruder with a vent (VC-40 manufactured by K.K. Chuo Kikai Seisakusho) to obtain pellets. 70 parts of the pellets thus obtained were supplied, together with 50 parts of a bisphenol A type polycarbonate (Idemitsu Polycarbonate A-2500, manufactured by Idemitsu Petrochemical Co., Ltd.), 0.5 part of diethyl 3,5-di-t-butyl-4-hydroxybenzyl phosphonate (IRGANOX 1222, manufactured by Nippon Ciba Gaigy K.K.) and 0.1 part of trimellitic acid anhydride, to a Henschel mixer, and mixed. Then, the mixture was supplied to VC-40 type extruder, and melt-kneaded and pelletized. The resulting thermoplastic resin composition had a composition comprising 20 parts of the polymer composition (E), 50 parts of the ABS resin (composition comprising the ABS resin powder and the AS resin powder) and 50 parts of the polycarbonate resin.

A molded product was prepared by using the pellets thus obtained, and the physical properties were evaluated. The results are shown by Test Nos. 1 to 50 in Table 5.

The measured values of the physical properties were obtained by the following methods.
(1) Tensile yield strength: ASTM D-638
(2) Izod impact strength: ASTM D-256
(3) Vicat softening point: JIS K-6870
(4) Spiral flow (flow length):

As an index for the molding processability, the flow length of the resin was measured when it was injection-molded under prescribed conditions in accordance with the following method.

Molding machine: Kawaguchi Charchil 1040S, manufactured by Kawaguchi Tekko K.K.

Mold: An Archimedes circle in its cross section obtained by equally dividing the ellipse having a major axis of 5.0 mm and a minor axis of 4.6 mm along the major axis.

Molding conditions:
Injection pressure: 50 kg/cm$^2$G
Cylinder temperature: 260° C.
Mold temperature: 40° C.

Measuring method and evaluation: The length of the molded product from the gate portion to the free flow end was measured. The evaluation is made on the basis that the greater the flow length, the better the molding processability.

(5) Chemical resistance (environmental stress cracking resistance)

An ASTM D-638 type I dumbbell was fixed to jigs with a deflection of 50 mm, and, after the application of acetic acid (special grade reagent), left at a temperature of 23° C., whereby the time till rupture was represented by minutes. In the Table, >300 means that no rupture was observed upon expiration of 300 minutes.

(6) Gloss

Pellets were injection-molded by IS-80 CN-V injection molding machine manufactured by Toshiba Kikai K.K. to obtain a molded sheet product of $50 \times 85 \times 3$ mm. The gate shape was a tab gate.

The molded product was subjected to the measurement of the gloss at an angle of incidence of 60° by means of a digital variable angle gloss meter Model UGV-4D, manufactured by Suga Shikenki K.K.

(7) Lamellar peeling and flow mark

A strip-shape molded product of $20 \times 80 \times 3$ mm was prepared by IS-80 CN-V injection molding machine manufactured by Toshiba Kikai K.K. The gate was located at a center of one side of a length of 20 mm, and the gate shape was an edge gate having a length of 2 mm and a rectangular cross section with 2 mm in the direction of the molded product and 1.5 mm in the direction of the thickness. The mold cavity was designed for four products.

When the gate portion of the molded product is broken by fingers, the portion around the gate may undergo lamellar peeling. The degree of the peeling was evaluated in comparison with a standard test sample as described hereinafter.

Likewise, a fan-shaped flow mark is likely to form around the gate of the molded product, and the degree of the flow mark was evaluated in comparison with a standard test sample as described below in the same manner as in the case of the lamellar peeling.

A: Not observed at all
B: Slightly observed
C: Substantially observed
D: Remarkably observed A ranking AB indicates that the evaluated level is inbetween ranking A and ranking B.

TABLE 5

| Example or Comparative Example | Test No. | Component (D) | Component (C) | Tensile yield strength (kg/cm$^2$) | Izod impact strength (kg·cm/cm) | Chemical resistance (min) | Gloss (%) | Vicat softening point (°C.) | Spiral flow (cm) | Lamellar peeling | Flow mark |
|---|---|---|---|---|---|---|---|---|---|---|---|
| Example 1 | 1 | D-1 | C-3 | 430 | 60 | >300 | 98 | 107 | 25 | A | A |
| | 2 | D-2 | C-3 | 420 | 61 | >300 | 98 | 108 | 27 | A | AB |
| | 3 | D-3 | C-3 | 420 | 64 | >300 | 97 | 106 | 28 | A | AB |
| | 4 | D-4 | C-3 | 420 | 63 | >300 | 101 | 104 | 28 | A | B |

TABLE 5-continued

| Example or Comparative Example | Test No. | Component (D) | Component (C) | Tensile yield strength (kg/cm²) | Izod impact strength (kg · cm/cm) | Chemical resistance (min) | Gloss (%) | Vicat softening point (°C.) | Spiral flow (cm) | Lamellar peeling | Flow mark |
| --- | --- | --- | --- | --- | --- | --- | --- | --- | --- | --- | --- |
| | 5 | D-5 | C-3 | 430 | 61 | >300 | 99 | 108 | 24 | A | A |
| | 6 | D-6 | C-3 | 420 | 67 | >300 | 97 | 101 | 27 | B | B |
| | 7 | D-7 | C-3 | 430 | 66 | >300 | 95 | 104 | 24 | A | A |
| | 8 | D-8 | C-3 | 430 | 61 | >300 | 96 | 105 | 25 | A | A |
| | 9 | D-9 | C-3 | 430 | 58 | >300 | 95 | 107 | 26 | AB | A |
| | 10 | D-10 | C-3 | 430 | 62 | >300 | 94 | 112 | 23 | AB | A |
| | 11 | D-11 | C-3 | 420 | 51 | >300 | 94 | 118 | 27 | A | A |
| | 12 | D-12 | C-3 | 420 | 62 | >300 | 96 | 100 | 27 | A | A |
| | 13 | D-13 | C-3 | 420 | 66 | >300 | 96 | 103 | 27 | A | A |
| | 14 | D-14 | C-3 | 420 | 67 | >300 | 84 | 108 | 24 | A | AB |
| | 15 | D-21 | C-3 | 440 | 61 | >300 | 98 | 107 | 25 | A | A |
| | 16 | D-22 | C-3 | 430 | 60 | >300 | 98 | 106 | 28 | A | AB |
| | 17 | D-23 | C-3 | 410 | 65 | >300 | 96 | 108 | 29 | A | AB |
| | 18 | D-1 | C-1 | 430 | 63 | >300 | 96 | 106 | 24 | A | A |
| | 19 | D-1 | C-2 | 420 | 48 | >300 | 93 | 107 | 26 | A | A |
| | 20 | D-1 | C-4 | 420 | 62 | >300 | 97 | 107 | 25 | A | A |
| | 21 | D-1 | C-5 | 420 | 60 | >300 | 95 | 107 | 24 | A | A |
| | 22 | D-1 | C-6 | 420 | 61 | >300 | 97 | 106 | 24 | A | A |
| | 23 | D-1 | C-7 | 430 | 57 | >300 | 98 | 108 | 25 | A | A |
| | 24 | D-1 | C-8 | 430 | 59 | >300 | 98 | 108 | 25 | A | A |
| | 25 | D-1 | C-9 | 430 | 62 | 209 | 98 | 109 | 24 | A | A |
| | 26 | D-1 | C-10 | 450 | 54 | 156 | 99 | 109 | 22 | A | A |
| | 27 | D-1 | C-11 | 440 | 48 | >300 | 96 | 108 | 24 | A | A |
| | 28 | D-1 | C-12 | 440 | 46 | >300 | 97 | 107 | 26 | A | A |
| | 29 | D-1 | C-13 | 460 | 41 | >300 | 101 | 108 | 26 | A | A |
| | 30 | D-1 | C-14 | 470 | 30 | 171 | 100 | 108 | 26 | A | A |
| | 31 | D-1 | C-15 | 430 | 47 | 86 | 94 | 107 | 24 | A | A |
| | 32 | D-1 | C-16 | 420 | 61 | >300 | 93 | 108 | 24 | A | A |
| | 33 | D-1 | C-17 | 420 | 62 | >300 | 93 | 107 | 25 | A | A |
| | 34 | D-1 | C-18 | 440 | 62 | >300 | 94 | 108 | 25 | A | A |
| | 35 | D-1 | C-19 | 420 | 60 | >300 | 96 | 108 | 24 | A | A |
| | 36 | D-1 | C-20 | 440 | 55 | >300 | 94 | 107 | 24 | A | A |
| | 37 | D-1 | C-21 | 440 | 52 | >300 | 98 | 107 | 25 | A | A |
| | 38 | D-1 | C-22 | 440 | 55 | 88 | 97 | 107 | 25 | A | A |
| | 39 | D-1 | C-23 | 420 | 64 | >300 | 92 | 108 | 27 | A | A |
| | 40 | D-1 | C-24 | 450 | 57 | >300 | 99 | 108 | 25 | A | A |
| | 41 | D-1 | C-28 | 430 | 54 | >300 | 98 | 108 · | 24 | A | A |
| Comparative Example 1 | 42 | D-15 | C-3 | 380 | 66 | >300 | 88 | 98 | 25 | A | AB |
| | 43 | D-16 | C-3 | 430 | 55 | 125 | 96 | 107 | 29 | B | D |
| | 44 | D-17 | C-3 | 420 | 54 | 76 | 96 | 105 | 33 | D | D |
| | 45 | D-18 | C-3 | 430 | 39 | >300 | 84 | 105 | 25 | D | D |
| | 46 | D-19 | C-3 | 430 | 52 | >300 | 97 | 107 | 22 | D | D |
| | 47 | D-20 | C-3 | 430 | 43 | >300 | 44 | 107 | 21 | B | D |
| | 48 | D-1 | C-25 | 470 | 26 | 5.4 | 100 | 108 | 24 | A | A |
| | 49 | D-1 | C-26 | 440 | 57 | 6.0 | 100 | 108 | 23 | A | A |
| | 50 | D-1 | C-27 | 420 | 55 | 6.4 | 91 | 108 | 23 | A | A |

Test Nos. 1 to 41 represent the Example of the present invention, and Test Nos. 42 to 50 represent the Comparative Example.

In Test No. 42 as the Comparative Example, the glass transition temperature of component (D) is outside the range of the present invention, and when an emulsion of such component (D) and an emulsion of component (C) were mixed and precipitated to obtain a solid of a polymer composition E, the solid does not form a powder but aggregates, whereby there were operational disadvantages in the steps for the dehydration and washing with water of the precipitates, in the drying step or in the step of mixing with the elastomer-containing styrene resin and/or the polycarbonate resin. In the tests other than Comparative Example Test No. 42, the solid of the polymer composition (E) was in a powder form in each case, and there was no operational disadvantage.

As is apparent from the Comparative Example, if the weight average molecular weight or the solubility parameter of component (D) is outside the range of the present invention, the lamellar peeling phenomenon or the flow mark tends to be distinct. If the glass transition temperature of component (D) is outside the range of the present invention, the heat resistance or the operation efficiency for the preparation tends to be inferior. If the gel content of component (D) is outside the range of the present invention, the gloss tends to be inferior. Likewise, if the solubility parameter, the gel content or the glass transition temperature of component (C) is outside the range of the present invention, the environmental stress cracking resistance tends to be inferior.

EXAMPLE 2 and COMPARATIVE EXAMPLE 2

Emulsion D-1 and emulsion C-3 prepared in Example 1, were mixed in a emulsion state in the proportions as identified in Table 6 (the parts in the Table represent the parts of the solid content of the polymer). Further, 7 parts of the 10% aqueous solution of Pluronic F-68 as used in Example 1, was added, relative to 100 parts of the solid content of the polymer mixture.

The emulsion mixture thus obtained was treated in the same manner as in Example 1 to obtain polymer compositions E-1 to E-8.

Then, the same ABS resin powder, AS resin powder, polycarbonate resin and stabilizer as used in Example 1, were mixed together with polymer compositions E-1 to E-8, in a Henschel mixer in the following proportions, and then pelletized by supplying the mixture to the VC-40 type extruder.

ABS resin powder: 28 parts
AS resin powder: 22 parts
Polycarbonate resin: 50 parts
Mark 1500: 0.5 part
Irganox 1222: 0.5 part
Trimellitic acid anhydride: 0.1 part
Polymer composition (E): 20 parts Pellets thus obtained were subjected to the evaluation of the physical properties in the same manner as in Example 1. The results are shown in Table 7.

TABLE 6

| Polymer composition (E) | E-1 | E-2 | E-3 | E-4 | E-5 | E-6 | E-7 | E-8 |
|---|---|---|---|---|---|---|---|---|
| Amount of | 20 | 30 | 40 | 70 | 80 | 90 | 10 | 95 |
| D-1 (parts) | | | | | | | | |
| Amount of C-3 (parts) | 80 | 70 | 60 | 30 | 20 | 10 | 90 | 5 |

The emulsion mixture thus obtained was subjected to precipitation treatment in the same manner as in Example 1, whereby a powder of a polymer composition (E) was obtained.

Then, the polymer composition (E) was blended with the same ABS resin powder, AS resin powder and polycarbonate resin as used in Example 1, in the proportions as identified in Table 8. Further, stabilizers were mixed in the following proportions relative to 100 parts of the blend, and the mixture was supplied to VC-40 type extruder to obtain pellets.

Mark 1500: 0.5 part
Irganox 1222: 0.5 part
Trimellitic acid anhydride: 0.1 part

Pellets thus obtained were subjected to the evaluation of the physical properties in the same manner as in Example 1. The results are shown in Table 8.

TABLE 8

| Example or Comparative Example | Test No. | ABS resin powder (parts) | AS resin powder (parts) | Polymer composition (E) (parts) | Polycarbonate (parts) | Tensile yield strength (kg/cm$^2$) | Izod impact strength (kg·cm/cm) | Chemical resistance (min) | Gloss (%) | Vicat softening point (°C.) | Spiral flow (cm) | Lamellar peeling | Flow mark |
|---|---|---|---|---|---|---|---|---|---|---|---|---|---|
| Example 3 | 59 | 6 | 4 | 10 | 90 | 580 | 60 | 142 | 106 | 132 | 14 | A | A |
| | 60 | 12 | 8 | 10 | 80 | 520 | 60 | >300 | 106 | 129 | 17 | A | A |
| | 61 | 12 | 8 | 20 | 80 | 460 | 63 | >300 | 104 | 117 | 19 | A | A |
| | 62 | 28 | 22 | 5 | 50 | 500 | 57 | 56 | 102 | 114 | 23 | A | A |
| | 63 | 28 | 22 | 10 | 50 | 470 | 60 | >300 | 100 | 110 | 24 | A | A |
| | 64 | 28 | 22 | 40 | 50 | 350 | 66 | >300 | 92 | 100 | 26 | A | A |
| | 65 | 28 | 22 | 50 | 50 | 330 | 71 | >300 | 88 | 97 | 28 | AB | A |
| | 66 | 36 | 44 | 10 | 20 | 430 | 22 | >300 | 94 | 103 | 30 | A | A |
| | 67 | 36 | 44 | 20 | 20 | 390 | 28 | >300 | 94 | 98 | 29 | A | A |
| Comparative Example 3 | 68 | 28 | 22 | 0 | 50 | 530 | 37 | 5.1 | 96 | 106 | 23 | A | A |
| | 69 | 36 | 44 | 0 | 20 | 470 | 3.3 | 0.2 | 92 | 101 | 31 | A | A |
| | 70 | 40 | 60 | 20 | 0 | 450 | 21 | >300 | 92 | 94 | 34 | A | A |
| | 71 | 2 | 0 | 2 | 100 | 600 | 69 | 7.7 | 108 | 141 | 7.2 | A | A |
| | 72 | 28 | 22 | 110 | 50 | 280 | 64 | >300 | 96 | 94 | 20 | B | A |

It is evident from Comparative Example 3 that if the content of the polymer composition (E) is inadequate, the environmental stress cracking resistance tends to be poor, and if it is excessive, the rigidity or the heat resis-

TABLE 7

| Example or Comparative Example | Test No. | Polymer composition (E) | Tensile yield strength (kg/cm$^2$) | Izod impact strength (kg·cm/cm) | Chemical resistance (min) | Gloss (%) | Vicat softening point (°C.) | Spiral flow (cm) | Lamellar peeling | Flow mark |
|---|---|---|---|---|---|---|---|---|---|---|
| Example 2 | 51 | E-1 | 380 | 72 | >300 | 90 | 103 | 28 | B | B |
| | 52 | E-2 | 390 | 69 | >300 | 91 | 108 | 27 | B | B |
| | 53 | E-3 | 430 | 65 | >300 | 97 | 108 | 26 | A | A |
| | 54 | E-4 | 470 | 57 | >300 | 98 | 111 | 24 | A | A |
| | 55 | E-5 | 480 | 51 | 131 | 102 | 113 | 23 | A | A |
| | 56 | E-6 | 500 | 51 | 71 | 104 | 114 | 23 | A | A |
| Comparative Example 1 | 57 | E-7 | 360 | 75 | >300 | 91 | 98 | 28 | D | D |
| | 58 | E-8 | 500 | 48 | 16 | 104 | 113 | 23 | A | A |

It is evident from Comparative Example 2 that if the content of component (C) in the polymer composition (E) is lower than the lower limit of the range of the present invention, the environmental stress cracking resistance tends to be inferior, and if it exceeds the upper limit, the lamellar peeling or the flow mark tends to be remarkable, such being undesirable.

EXAMPLE 3 and COMPARATIVE EXAMPLE 3

50 parts (as solid content of polymer) of emulsion D-1 and 50 parts (as solid content of polymer) of emulsion C-3 prepared in Example 1, were mixed in an emulsion state, and 7 parts of the 10% aqueous solution of Pluronic F-68, was further added thereto.

tance tends to be inferior. Further, if the content of the elastomer-containing styrene resin is inadequate, the molding processability tends to be inferior, and if it is excessive, the heat resistance tends to be poor.

EXAMPLE 4

The powder of the polymer composition (E) prepared in Example 3, was supplied to VC-40 type extruder to obtain pellets.

On the other hand, 56 parts of the ABS resin powder and 44 parts of the AS resin powder prepared in Example 1, were mixed in a Henschel mixer, and the mixture was supplied to VC-40 type extruder to obtain ABS resin pellets.

The pellets thus obtained were mixed in the following proportions, and the mixture was supplied to VC-40 type extruder to obtain pellets.

| ABS resin pellets: | 50 parts |
| --- | --- |
| Polycarbonate resin: | 50 parts |
| Polymer composition (E) pellets: | 20 parts |
| Mark 1500: | 0.5 part |
| Irganox 1222: | 0.5 part |
| Trimellitic acid anhydride: | 0.1 part |

Pellets thus obtained were subjected to the evaluation of the physical properties in the same manner as in Example 1, whereby the tensile yield strength was 430 kg/cm², the Izod impact strength was 62 kg.cm/cm, the chemical resistance was >300 min, the gloss was 99%, the Vicat softening point was 108° C., the spiral flow was 26 cm, the lamellar peeling was A, and the flow mark was A.

EXAMPLE 5 and COMPARATIVE EXAMPLE 5

A mixture comprising 20 parts of an ABS resin comprising 62.5% of polybutadiene, 10.5% of acrylonitrile and 27.0% of styrene and 80 parts of a copolymer resin (weight average molecular weight based on polystyrene: $1.08 \times 10^5$) comprising 24% of acrylonitrile and 76% of α-methylstyrene, was pelletized to obtain ABS resin pellets.

The ABS resin pellets were blended with pellets of the polymer composition (E) and the polycarbonate resin in the proportions as identified in Table 9, and stabilizers were further mixed in the following proportions relative to 100 parts of the blend. The mixture thus obtained was supplied to VC-40 type extruder to obtain pellets.
Mark 1500: 0.5 part
Irganox 1222: 0.5 part
Trimellitic acid anhydride: 0.1 part
Pellets thus obtained were subjected to the evaluation of the physical properties in the same manner as in Example 1. The results are shown in Table 9.

EXAMPLE 6 and COMPARATIVE EXAMPLE 6

Pellets were obtained in the same manner as in Example 5 except that as the elastomer-containing styrene resin, an AES resin comprising 28% of a poly(ethylene-propylene) rubber (ethylene: 70 mol %, iodine value: 20), 21.6% of acrylonitrile and 50.4% of styrene, or an AAS resin comprising 22% of an acrylic rubber (a polymer comprising 100 parts of n-butyl acrylate, 5 parts of norbornadiene and 0.2 part of divinylbenzene), 20% of acrylonitrile and 58% of styrene, was used. The blend composition of the resins and the physical properties are shown in Table 10.

TABLE 10

| Example or Comparative Example | Test No. | AES resin pellets (parts) | AAS resin pellets (parts) | Polycarbonate resin (parts) | Polymer composition (E) (parts) | Tensile yield strength (kg/cm²) | Izod impact strength (kg · cm/cm) | Chemical resistance (min) | Gloss (%) | Vicat softening point (°C.) | Spiral flow (cm) | Lamellar peeling | Flow mark |
| --- | --- | --- | --- | --- | --- | --- | --- | --- | --- | --- | --- | --- | --- |
| Example 6 | 79 | 42 | 0 | 42 | 16 | 450 | 55 | >300 | 92 | 108 | 23 | A | A |
|  | 80 | 0 | 42 | 42 | 16 | 420 | 31 | >300 | 87 | 103 | 21 | A | A |
| Comparative Example 6 | 81 | 50 | 0 | 50 | 0 | 470 | 37 | 14 | 90 | 112 | 24 | A | A |
|  | 82 | 0 | 50 | 50 | 0 | 440 | 19 | 32 | 84 | 108 | 24 | A | A |

It is evident from Examples 5 and 6 that the effects of the present invention are obtainable irrespective of the elastomer component in the elastomer-containing styrene resin or the type of the resin component.

EXAMPLE 7

68 parts (as solid content of polymer) of an emulsion of an ABS resin comprising 50% of polybutadiene, 15% of acrylonitrile and 35% of styrene and 32 parts (as solid content of polymer) of emulsion C-3 were mixed in an emulsion state, and then an aqueous calcium chloride solution was poured thereto. The mixture was stirred at 95° C. The precipitates thus formed were filtered to recover the polymer. The mixture thus obtained was dried, and 25 parts of the mixture was blended with 29 parts of the same AS resin powder as used in Example 1, 46 parts of the polycarbonate, 0.5 part of Mark 1500 and 0.5 part of Irganox 1222, in a Henschel mixer, and the blend was supplied to an extruder to obtain pellets.

A molded product was prepared from the pellets, and the physical properties were evaluated, whereby the tensile yield strength was 440 kg/cm², the Izod impact strength was 60 kg.cm/cm, the Vicat softening point was 108° C., the spiral flow was 24.4 cm, the chemical resistance was >300 min, the lamellar peeling was B, and the flow mark was B.

I claim:
1. A thermoplastic resin composition composed of a mixture comprising:
(A) from 5 to 94% by weight of an elastomer-containing styrene resin comprising an elastomer compo-

TABLE 9

| Example or Comparative Example | Test No. | ABS resin pellets (parts) | Polycarbonate resin (parts) | Polymer composition (E) pellets (parts) | Tensile yield strength (kg/cm²) | Izod impact strength (kg · cm/cm) | Chemical resistance (min) | Gloss (%) | Vicat softening point (°C.) | Spiral flow (cm) | Lamellar peeling | Flow mark |
| --- | --- | --- | --- | --- | --- | --- | --- | --- | --- | --- | --- | --- |
| Example 5 | 73 | 46 | 46 | 8 | 580 | 32 | >300 | 102 | 131 | 19 | A | A |
|  | 74 | 42 | 42 | 16 | 550 | 34 | >300 | 100 | 128 | 18 | A | A |
|  | 75 | 76 | 16 | 8 | 570 | 10 | >300 | 97 | 127 | 19 | A | A |
|  | 76 | 72 | 12 | 16 | 540 | 8.2 | >300 | 98 | 122 | 20 | A | A |
| Comparative Example 5 | 77 | 54 | 46 | 0 | 580 | 20 | 34 | 104 | 135 | 19 | A | A |
|  | 78 | 84 | 16 | 0 | 580 | 6.8 | 6.7 | 102 | 128 | 19 | A | A | nent and a resin component having a glass transition temperature of higher than 20° C., with a covalent bonding of the elastomer and resin components being present at the interface between the elastomer component constituting a dispersed phase and the resin component constituting a continuous phase;

(B) from 5 to 94% by weight of a polycarbonate resin; and (C) from 0.1 to 20% by weight of a polymer of a monomer containing an acrylate monomer having a solubility parameter of from 8.4 to 9.8 $(cal/cc)^{\frac{1}{2}}$, a glass transition temperature of not higher than 20° C. and a gel content of not higher than 70% by weight.

2. The thermoplastic resin composition according to claim 1, wherein the elastomer component of (A) is the polymer of a monomeric composition which contains, as an essential component, a monomer selected from the group consisting of a conjugated diene monomer, an olefin monomer and an acrylate monomer.

3. The thermoplastic resin composition according to claim 1, wherein the resin component of (A) is the polymer of an aromatic vinyl monomer.

4. The thermoplastic resin composition according to claim 1, wherein the resin component of (A) is the polymer of a mixture of an aromatic vinyl monomer and at least one monomer selected from the group consisting of a vinyl cyanide monomer, a (meth)acrylate monomer and a maleimide monomer.

5. The thermoplastic resin composition according to claim 1, wherein the elastomer-containing styrene resin is prepared by polymerizing the monomer for the resin component in the presence of the elastomer component.

6. The thermoplastic resin composition according to claim 1, wherein the elastomer-containing styrene resin is a mixture comprising an elastomer-containing styrene resin prepared by polymerizing a monomer for the resin component in the presence of the elastomer component and an additional resin component composed of a polymer of a vinyl monomer separately polymerized and having a glass transition temperature of higher than 20° C.

7. The thermoplastic resin composition according to claim 1, wherein the polycarbonate resin is a resin prepared from 2,2-bis-(4-oxyphenyl)propane.

8. The thermoplastic resin composition according to claim 1, wherein the component (C) is the polymer of acrylate monomer.

9. The thermoplastic resin composition according to claim 1, wherein the component (C) is the polymer of a monomer composition comprising an acrylate monomer and at least one monomer selected from the group consisting of a methacrylate monomer, an aromatic vinyl monomer, a vinyl cyanide monomer, an olefin monomer and a vinyl ether monomer.

10. A process for preparing a thermoplastic resin composition composed of a mixture comprising:

(A) from 5 to 94% by weight of an elastomer-containing styrene resin comprising an elastomer component and a resin component having a glass transition temperature of higher than 20° C., with a covalent substance of the elastomer and resin components being present at the interface between the elastomer component constituting a dispersed phase and the resin component constituting a continuous phase;

(B) from 5 to 94% by weight of a polycarbonate resin; and (C) from 0.1 to 20% by weight of a polymer of a monomer containing an acrylate monomer having a solubility parameter of from 8.4 to 9.8 $(cal/cc)^{\frac{1}{2}}$, a glass transition temperature of not higher than 20° C. and a gel content of not higher than 70% by weight, which comprises mixing from 10 to 80% by weight (as solid content of polymer) of an emulsion of the polymer of component (C) and from 20 to 90% by weight (as solid content of polymer) of an emulsion of (D) a polymer of a vinyl monomer having a glass transition temperature of higher than 20° C., a gel content of not higher than 10%, a solubility parameter of from 9.0 to 11.0 $(cal/cc)^{\frac{1}{2}}$ and a weight average molecular weight, based on polystyrene, of at least $2 \times 10^5$, in an emulsion state; then separating (E) a polymer composition from the mixture; and mixing from 0.5 to 50% by weight of the polymer composition (E) with from 5 to 94% by weight of the elastomer-containing styrene resin and from 5 to 94% by weight of the polycarbonate resin.

11. The process for preparing a thermoplastic resin composition according to claim 10, wherein the elastomer component of (A) is the polymer of a monomeric composition which contains, as an essential component, a monomer selected from the group consisting of a conjugated diene monomer, an olefin monomer and an acrylate monomer.

12. The process for preparing a thermoplastic resin composition according to claim 10, wherein the resin component of (A) is the polymer of an aromatic vinyl monomer.

13. The process for preparing a thermoplastic resin composition according to claim 10, wherein the resin component of (A) is the polymer of a monomeric mixture which comprises an aromatic vinyl monomer and at least one monomer selected from the group consisting of a vinyl cyanide monomer, a (meth)acrylate monomer and a maleimide monomer.

14. The process for preparing a thermoplastic resin composition according to claim 10, wherein the elastomer-containing styrene resin is prepared by polymerizing the monomer for the resin component in the presence of the elastomer component.

15. The process for preparing a thermoplastic resin composition according to claim 10, wherein the elastomer-containing styrene resin is a mixture comprising an elastomer-containing styrene resin prepared by polymerizing a monomer for the resin component in the presence of the elastomer component and an additional resin component composed of a polymer of a vinyl monomer separately polymerized and having a glass transition temperature of higher than 20° C.

16. The process for preparing a thermoplastic resin composition according to claim 10, wherein the polycarbonate resin is a resin prepared from 2,2-bis-(4-oxyphenyl)propane.

17. The process for preparing a thermoplastic resin composition according to claim 10, wherein component (C) is the polymer of an acrylate monomer.

18. The process for preparing a thermoplastic resin composition according to claim 10, wherein the component (C) is the polymer of a monomeric mixture which comprises an acrylate monomer and at least one monomer selected from the group consisting of a methacrylate monomer, an aromatic vinyl monomer, a vinyl cyanide monomer, an olefin monomer and a vinyl ether monomer.

19. The process for preparing a thermoplastic resin composition according to claim 10, wherein the component (D) is the polymer of at least one monomer selected from the group consisting of an aromatic vinyl monomer, a vinyl cyanide monomer, an acrylate monomer and a methacrylate monomer.

20. The process for preparing a thermoplastic resin composition according to claim 10, wherein component (D) is polystyrene.

21. The process for preparing a thermoplastic resin composition according to claim 10, wherein component (D) is a poly(styrene-acrylonitrile).

22. The process for preparing a thermoplastic resin composition according to claim 10, wherein component (C) and component (D) are prepared by emulsion polymerization.

23. A thermoplastic resin composition composed of a mixture comprising (A) from 5 to 94% by weight of an elastomer-containing styrene resin comprising an elastomer component and a resin component having a glass transition temperature of higher than 20° C., with a covalent bonding of the elastomer and resin components being present at the interface between the elastomer component constituting a dispersed phase and the resin component constituting a continuous phase; (D) a resinous component which is a polymer of a vinyl monomer having a glass transition temperature of higher than 20° C., a gel content of not higher than 10%, a solubility parameter of from 9.0 to 11.0 (cal/cc)$^{\frac{1}{2}}$ and a weight average molecular weight, based on polystyrene, of at least $2 \times 10^5$, (B) from 5 to 94% by weight of a polycarbonate resin, and (C) from 0.1 to 20% by weight of a polymer of an acrylate monomer having a solubility parameter of from 8.4 to 9.8 (cal/cc)$^{\frac{1}{2}}$, a glass transition temperature of not higher than 20° C. and a gel content of not higher than 70% by weight, the weight proportions of component (D) and the component (C) being such that there is 20 to 90% of the former to 10 to 80% of the latter, the sum of the two being 100%, and the sum of the weights of components (D) and (C) being 0.5 to 50% of the total of the weights of (A), (B), (C) and (D).

24. A composition according to claim 23 wherein
(A) is an acrylonitrile-butadiene-styrene copolymer
(D) is an acrylonitrile-styrene copolymer
(B) is a 2,2-bis-(4-oxyphenyl) propane polycarbonate resin; and
(C) is a butyl-acrylate-methyl methacrylate-ethyleneglycol dimethacrylate copolymer.

* * * * *